UNITED STATES PATENT OFFICE.

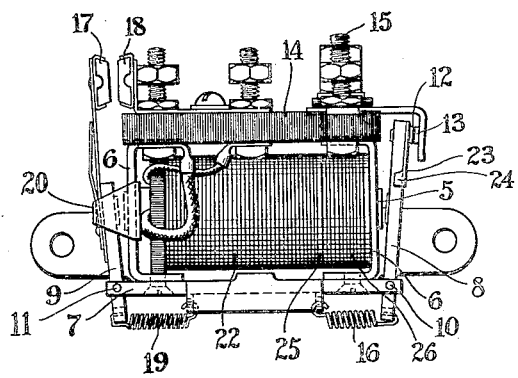

ROBERT A. HOPPE AND THOMAS L. LEE, OF ROCHESTER, NEW YORK, ASSIGNORS TO NORTH EAST ELECTRIC COMPANY, OF ROCHESTER, NEW YORK, A CORPORATION OF NEW YORK.

CONTROLLER FOR ELECTRIC GENERATORS.

1,149,054.   Specification of Letters Patent.   Patented Aug. 3, 1915.

Application filed November 17, 1913. Serial No. 801,507.

*To all whom it may concern:*

Be it known that we, ROBERT A. HOPPE and THOMAS L. LEE, citizens of the United States, and residents of Rochester, in the county of Monroe and State of New York, have invented certain new and useful Improvements in Controllers for Electric Generators, of which the following is a specification.

This invention relates to an electro-magnetic instrument, in the nature of a relay, for the automatic control of an electric generator operating under variable speed and load, particularly in connection with a storage-battery.

In an electric system, such as is employed on railway trains and motor-vehicles, in which the generator is driven at variable speed by connection with a part of the mechanism of the vehicle, it is common to employ a device which prevents undue rise in the electromotive force of the generator, at high speeds, by automatically introducing resistance into the circuit through which the shunt field-winding of the generator is energized, such a device being usually in the form of a simple electro-magnetic relay, having an armature controlling a short-circuit around a resistance-device. In such an instrument the armature tends to have a vibratory or chattering action when the generator is at a critical speed, with a more or less destructive action upon the contact-devices controlled by the armature.

One object of the present invention, accordingly, is to improve an instrument of the kind in question by damping this vibratory action, and to this end we propose to employ a highly conductive annular member, surrounding the magnetic core of the instrument and affording a path for eddy-currents, by which the magnetic flux in the core is caused to lag.

For the further protection of the contact-devices we employ simple and effective means for conducting from them the heat resulting from sparking.

To further improve and simplify the instrument, we propose to employ the annular conductive member above referred to as a means for conducting heat away from the resistance-wire with which the instrument coöperates, and to this end we make the conductive member in the form of a spool, upon which the resistance-wire is wound, the winding being preferably noninductive in arrangement, so as not to modify the action of the core upon the armature.

In systems of the kind in question, wherein a storage-battery is used, it is also common to employ a device, in the nature of a relay, by which the return-flow of current from the battery through the generator is normally prevented, when the speed of the generator falls so low that the electromotive force generated is less than that of the battery.

A further object of the present invention is to combine this latter instrument, which will be hereinafter referred to as a "master-relay," with the instrument above referred to, which will be hereinafter described as a "limiting-relay," in such a manner as to produce a simple, compact and inexpensive instrument in which a single core and a single set of windings suffice for the control of both relay-armatures, and in which the magnetic circuit is so arranged as to produce a useful coöperation between the two armatures, by which their operation is rendered more certain.

To this end we employ an instrument in which the two armatures constitute parts of a single magnetic circuit, having two air-gaps but only a single set of windings, these windings preferably comprising a constantly-energized shunt-winding, and a series-winding controlled by the master-relay armature.

In the accompanying drawings:—Figure 1 is a front-elevation of a controller embodying the present invention; Fig. 2 is a right-hand elevation of the same; Fig. 3 is a vertical section on the line 3—3 in Fig. 2; and Fig. 4 is a diagram, showing the preferred manner of connecting the controller with the other parts of the generating-system.

The invention is illustrated as embodied in an instrument adapted to coöperate with a differentially-wound electric generator connected with translating-devices and with a storage-battery floated on the line.

As shown particularly in Fig. 3, the controller comprises a straight core 5 of soft iron, which is supported, at its ends, by plates 6 of non-magnetic material such as brass. These plates, in turn, are fixed to a base-plate 7 of iron.

The two armatures, 8 and 9, of the controller are mounted upon pivots 10 and 11 in the opposite forked ends of the base-plate 7, in position to coöperate with the opposite ends of the core 5. The armature 8, which is proper to the action of the instrument as a limiting-relay, carries a contact-member 12 which coöperates with a fixed contact-member 13 mounted upon a plate 14 of insulating-material, this plate being fixed to the end-plates 6, as shown in Fig. 3, and one of the attaching-devices 15 being conveniently employed also as one of the binding-posts for connecting the instrument with external circuits. A spring 16, connecting the lower end of the armature 8 with the base-plate 7, tends to draw the armature 8 away from the core 5, so as to maintain the contact-devices 12 and 13 in engagement, and this is the position occupied by the parts except when the generator exceeds a predetermined speed, to which the spring 16 is regulated.

The armature 9, which is proper to the operation of the instrument as a master-relay or reverse-current cut-out, carries a contact-member 17, which coöperates with a similar member 18 mounted upon the insulating-plate 14. A spring 19, connected with the lower end of the armature 9, tends to move the armature away from the core 5, and to disengage the contacts 17 and 18, and this outward movement of the armature is limited by a stop-arm 20 (Fig. 1), fixed between the left-hand plate 6 and the corresponding end of the core, as shown in Fig. 3.

Two windings are employed to energize the magnetic circuit of the controller. These windings are mounted upon the core 5; and the inner winding 21, which may be described as the "series-winding," comprises a few turns of heavy wire, while the outer winding 22, which may be described as the "shunt-winding," comprises many turns of fine wire.

As a simple and effective device for conducting heat away from the contact-members 12 and 13, we employ a thin plate 23 of material, such as copper, having a high heat-conductivity, this plate being secured in place by the contact-member 12, which is in the form of a rivet passing through the plate 23 and the armature 8 and headed on both sides to fix it in place. The plate 23 is further provided with lugs 24 embracing the lateral edges of the armature to prevent it from rotating about the contact-member 12. Heat resulting from sparks or arcing between the contact-members is conducted directly to the plate 23, from which it escapes by conduction and convection, and in this manner the wear upon the contact-members is substantially reduced.

The annular conductive member by which the movements of the armature 8 are damped, is in the form of a spool 25 of copper, which is fitted upon the right-hand end of the core 5, as shown in Fig. 3; and in order that this member may serve the further purpose above referred to, of conducting heat from the resistance-wire, this wire is wound upon the spool 25 in the form of a solenoid 26. In order that this winding may be non-inductive it is preferably wound in opposite directions from its middle point, as shown diagrammatically in Fig. 4.

In Fig. 4 the controller is shown as connected with the other parts of the apparatus with which it coöperates. The armature of the generator is indicated at 27, and the main field-winding at 28, which is a shunt-winding. This shunt-winding determines the polarity of the generator-field, but the generator is provided also with a series-winding 29 of comparatively few turns, which acts as an opposition-winding, the generator being thus differentially wound.

The generator is connected with a storage-battery 30 and with any translating-devices, such as electric-lights, energized thereby through main conductors 31 and 32. Assuming that the generator is started in operation, and that the brushes have the polarity indicated by the plus and minus signs in Fig. 4, current flows, from the upper brush, through wires 33 and 34, to the shunt-winding 22 of the controller, and thence back, through a wire 32, to the armature; and when the generator attains sufficient speed the armature 9 is attracted and moved to closed-circuit position. The main current then flows first through the wire 33, and through the series field-winding 29, to the fixed contact 18 and the armature 9 of the controller, and thence, through the series-winding 21 of the controller, to the main conductor 31. From this conductor it flows, through the translating-devices or the storage-battery, to the main conductor 32, and back to the negative brush.

During normal operation of the generator, therefore, the armature 9 is maintained in closed circuit position, through the combined effect of the series-winding 31 and the shunt-winding 22.

The shunt-winding 22 of the controller is constantly energized, so long as the generator is in operation but the flow of current through it is small, owing to its high resistance.

The shunt field-winding 28 of the generator draws current from the wire 33, and the current then flows through wires 35 and 36 to the fixed contact 13 of the limiting-relay. The current then flows through the armature 8 and a wire 38 to the main-conductor 32, and thence back to the armature of the generator. During the operation of the generator, therefore, the shunt field-winding is constantly energized.

The resistance-winding 26 is shunted across the wires 35 and 32, so that it is in parallel with the conductive path through the wire 36, the armature 8, and the wire 38. When the generator is running at moderate speed the magnetic pull upon the armature 8 is not sufficient to overcome the spring 16, so that this latter path is closed, the resistance-winding 23 is ineffective, and the flow through the shunt field-winding 28 is determined by the resistance of the latter. When the generator-speed exceeds a predetermined amount, however, the increased flow of current through the series-winding 21 of the controller increases the magnetization of the core 5, so that the spring 16 is overcome, and the armature 8 is drawn to open-circuit position. Now the path for the current through the shunt field-winding is through the resistance-winding 26, which cuts down the flow of current through the field-winding and opposes the tendency of the generator to attain an excessive electromotive force.

It is a well-known characteristic of generator-controlling instruments of the type in question, that through a certain range of speed of the generator, which may be described as the "critical" speed, the controller has a vibratory action. That is to say, the armature is first attracted, thus cutting resistance into series with the field-winding of the generator, but this results in an immediate reduction in the output of the generator which, in turn, reduces the magnetization of the core of the controller, whereupon the armature is drawn back by its spring so as again to close the contacts by which the resistance is short-circuited. Thereupon the output of the generator immediately rises again, causing a repetition of the foregoing operations. This action is usually very rapid, and the fluctuations in the output of the generator are more or less reduced or smoothed out by the impedance of the windings through which the current flows. An unduly rapid vibration tends, however, to cause an amount of arcing between the contact-points which rapidly destroys them. The utility of the annular conductive-member or spool 25 of the present instrument resides in the fact that it affords a path of low resistance for eddy-currents, which tend to delay flux-changes in the magnetic circuit, thus lengthening the period of the vibrations of the armature at the critical speed of the generator. It is not necessary or practicable, however, to completely eliminate the vibratory action, and accordingly the heat-conducting means mounted on the armature, as previously described, have utility in preventing overheating in consequence of the arcing due to the comparatively slow vibration to which it is still subject.

Both the series-winding 21 and the shunt-winding 22 of the controller coöperate to produce the described action of the limiting-relay armature 8, but the shunt-winding 22 is employed particularly in view of the operation of the instrument as a master-relay. In case the generator-speed is reduced to such an extent that the electromotive force of the generator is not sufficient to produce a substantial flow of current through the series-winding 21 of the controller, the spring 19 pulls the master-relay armature 9 away from the core 5, thus breaking the connection between the generator and the storage-battery, and preventing current from flowing back from the battery through the generator and being thus wasted. However, the shunt-winding 22 of the controller continues to be energized, so long as the generator has any movement, and when the speed of the generator rises again to a proper point the flow through the shunt-winding becomes sufficient to energize the core 5 to a degree which will permit the armature 9 to be drawn back, so as to close the main circuit and permit the generator to again supply current for recharging the battery, or for energizing the translating-devices.

It will be apparent that the magnetic circuit of the controller embraces the core 5, the armatures 8 and 9, and the iron base-plate 7. Accordingly, this magnetic circuit has two air-gaps, between the respective armatures and the ends of the core 5, and the reluctance of this magnetic circuit varies according as these air-gaps are opened or closed. In consequence of this arrangement there is a useful coöperation between the two armatures 8 and 9. When the generator is running at high speed the approach of the armature 8 to the core 5 reduces the reluctance of the magnetic circuit, thus increasing the pull of the core upon the armature 9, and maintaining the contacts 17 and 18 in firm engagement with each other. On the other hand, as the generator-speed falls the armature 8, in moving away from the core, increases the reluctance of the magnetic circuit and diminishes the pull upon the armature 9, thus preparing the instrument to perform the function, upon the further reduction of the generator-speed, of breaking the main circuit. Finally, when the armature 9 moves away from the core the reluctance of the magnetic circuit is further increased, whereby the pull upon the armature 8 is diminished, thus permitting the latter, through the action of the spring 16, to maintain the contact-points 12 and 13 firmly in engagement until the speed of the generator again rises. Accordingly, the controller is sensitive at the critical speeds of the generator, while its contacts are maintained firmly closed at other speeds.

While the several novel features of the present invention which have been pointed out are preferably employed in conjunction, to produce a simple, compact and reliable instrument capable of performing all of the functions of an automatic controller, it will be apparent that they are not necessarily used in such conjunction, and that the invention is not, in general, limited to the embodiment thereof hereinbefore described and illustrated in the accompanying drawings, but may be embodied in various other forms within the nature of the invention as it is defined in the following claims.

We claim:—

1. In an electro-magnetic controller, a single magnetic circuit comprising two armatures; contacts controlled by the armatures; and two windings, of high and low resistance, respectively, for energizing said circuit, the low-resistance winding being connected in series with the contacts controlled by one of the armatures.

2. In an electro-magnetic controller, a magnetic core; a master-relay armature coöperating with one end of the core; a limiting-relay armature coöperating with the opposite end of the core; contacts controlled by the armatures; a magnetic connecting member between the armatures whereby a magnetic circuit is formed through said member, the armatures, and the core; and a winding, on the core, affecting the action of both armatures.

3. In an electro-magnetic controller, a magnetic core, an armature coöperating therewith; a spring tending to move the armature away from the core; contacts controlled by the armature and arranged to be in engagement with each other when the armature is away from the core; a magnetic winding upon the core; and a non-inductive resistance-winding also upon the core and connected in series with said contacts.

4. In an electro-magnetic controller, a magnetic core, an armature coöperating therewith; a spring tending to move the armature away from the core; contacts controlled by the armature and arranged to be in engagement with each other when the armature is away from the core; a magnetic winding upon the core; a non-inductive resistance-winding also upon the core and connected in series with said contacts, and a spool of conductive material upon which the resistance-winding is wound and which has exposed flanges whereby the spool is adapted to perform the combined functions of a heat-conductor and a path for eddy currents.

5. In an electro-magnetic controller, a magnetic core; a master-relay armature and a limiting-relay armature coöperating with the core; springs tending to move the armatures away from the core; contacts controlled by the master-relay armature and arranged to be out of engagement with each other when said armature is away from the core; contacts controlled by the limiting-relay armature and arranged to be in engagement with each other when said armature is away from the core; a winding, of comparatively low resistance, upon the core and connected in series with the contacts controlled by the master-relay armature; and a non-inductive resistance-winding, also upon the core, connected in series with the contacts controlled by the limiting-relay armature.

6. In an electro-magnetic controller, a magnetic core; a master-relay armature and a limiting-relay armature coöperating with the core; springs tending to move the armatures away from the core; contacts controlled by the master-relay armature and arranged to be out of engagement with each other when said armature is away from the core; contacts controlled by the limiting-relay armature and arranged to be in engagement with each other when said armature is away from the core; a winding, of comparatively low resistance, upon the core and connected in series with the contacts controlled by the master-relay armature; a non-inductive resistance-winding, also upon the core, connected in series with the contacts controlled by the limiting-relay armature, and an inductive winding, upon the core, of comparatively high resistance and independent of the contacts.

7. In an electro-magnetic controller, a magnetic core provided with a low-resistance winding; an armature coöperating with the core; means tending to draw the armature away from the core; contacts controlled by the armature and arranged to be in engagement with each other when the armature is away from the core, one of said contacts being carried by the armature; and a plate, of high heat-conductivity, mounted on the armature, engaging the contact carried thereby, and extending away therefrom to conduct heat from said contact.

8. In an electro-magnetic controller, a magnetic core; an armature coöperating therewith; contact-devices controlled by the armature; a spool mounted on the core, and a high-resistance winding on said spool; the spool consisting of material highly conductive of both heat and electricity, and having its flanges exposed to the air, so as to constitute a path for eddy-currents and also for the dissipation of heat through its flanges.

ROBERT A. HOPPE.
THOMAS L. LEE.

Witnesses:
EDWARD A. HALBLEIB,
D. GURNEE.